United States Patent
Son

(10) Patent No.: US 11,372,966 B2
(45) Date of Patent: Jun. 28, 2022

(54) IMAGE PROCESSING APPARATUS, AUTHENTICATION APPARATUS, AND USER AUTHENTICATION METHOD OF IMAGE PROCESSING APPARATUS

(71) Applicant: HANWHA TECHWIN CO., LTD., Seongnam-si (KR)

(72) Inventor: Myung Hwa Son, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 126 days.

(21) Appl. No.: 16/611,641

(22) PCT Filed: Jul. 5, 2017

(86) PCT No.: PCT/KR2017/007155
§ 371 (c)(1),
(2) Date: Nov. 7, 2019

(87) PCT Pub. No.: WO2018/230764
PCT Pub. Date: Dec. 20, 2018

(65) Prior Publication Data
US 2020/0065472 A1   Feb. 27, 2020

(30) Foreign Application Priority Data

Jun. 16, 2017 (KR) .......................... 10-2017-0076815

(51) Int. Cl.
*G06F 21/44* (2013.01)
*G06F 21/46* (2013.01)

(52) U.S. Cl.
CPC .............. *G06F 21/44* (2013.01); *G06F 21/46* (2013.01)

(58) Field of Classification Search
None
See application file for complete search history.

(56) References Cited

U.S. PATENT DOCUMENTS 8,695,072 B2   4/2014 Wang
9,137,290 B2 *  9/2015 Yu ........................... H04L 41/28
(Continued)

FOREIGN PATENT DOCUMENTS

JP   2004070463 A  *  3/2004
JP   2007-208759 A    8/2007
(Continued)

OTHER PUBLICATIONS

Written Opinion dated May 23, 2018, issued by the International Searching Authority in International Application No. PCT/KR2017/007155 (PCT/ISA/237).

(Continued)

*Primary Examiner* — Jeffrey C Pwu
*Assistant Examiner* — Mayasa A. Shaawat
(74) *Attorney, Agent, or Firm* — Sughrue Mion, PLLC

(57) ABSTRACT

The present embodiments relate to an image processing apparatus and a user authentication method of the image processing apparatus. The image processing apparatus according to an embodiment of the disclosure includes: a first authentication unit configured to receive first authentication data from a user terminal, and to determine whether the first authentication data matches pre-stored first reference data to authenticate the user terminal; and a second authentication unit configured to generate, when additional authentication is set up, second reference data, requesting the user terminal to send second authentication data, to receive the second authentication data from the user terminal, and to determine whether the second authentication data matches the second reference data to authenticate the user terminal.

20 Claims, 11 Drawing Sheets

(56) References Cited

U.S. PATENT DOCUMENTS

| | | | | |
|---|---|---|---|---|
| 2010/0011220 A1* | 1/2010 | Zhao | ............... | H04L 9/0844 |
| | | | | 713/182 |
| 2014/0201831 A1* | 7/2014 | Yi | ............... | G06F 21/36 |
| | | | | 726/19 |

FOREIGN PATENT DOCUMENTS

| | | | | | |
|---|---|---|---|---|---|
| JP | 2007208759 A | * | 8/2007 | | |
| KR | 10-2011-0019684 A | | 2/2011 | | |
| KR | 20130069142 A | * | 6/2013 | ......... | G06F 21/608 |
| KR | 10-2013-0093794 A | | 8/2013 | | |
| KR | 10-1315040 B1 | | 10/2013 | | |
| KR | 10-1445816 B1 | | 9/2014 | | |
| KR | 20140105423 A | * | 9/2014 | | |
| KR | 10-1577036 B1 | | 12/2015 | | |
| KR | 10-2016-0138761 A | | 12/2016 | | |

OTHER PUBLICATIONS

Search Report dated May 23, 2018, issued by the International Searching Authority in International Application No. PCT/KR2017/007155 (PCT/ISA/210).

\* cited by examiner

IMAGE PROCESSING APPARATUS, AUTHENTICATION APPARATUS, AND USER AUTHENTICATION METHOD OF IMAGE PROCESSING APPARATUS

TECHNICAL FIELD

The embodiments relate to an image processing apparatus and a user authentication method of the image processing apparatus.

BACKGROUND ART

A security system verifies identity of a user trying to access a camera or a digital video recorder (DVR) to ensure security. For identity to be verified, a user needs to remember an authentication password and input it.

DESCRIPTION OF EMBODIMENTS

Technical Problem

Embodiments of the disclosure provide a user authentication method with enhanced security for access to an image processing apparatus.

Solution to Problem

An image processing apparatus according to an embodiment of the disclosure includes: a first authentication unit configured to receive first authentication data from a user terminal, and to determine whether the first authentication data matches pre-stored first reference data to authenticate the user terminal; and a second authentication unit configured to generate, when additional authentication is set up, second reference data, to request the user terminal to send second authentication data, to receive the second authentication data from the user terminal, and to determine whether the second authentication data matches the second reference data to authenticate the user terminal.

The first reference data may include a password of the user terminal set in the image processing apparatus.

The second reference data may be generated based on a MAC address of the image processing apparatus and a password of the user terminal set in the image processing apparatus.

The second reference data may be generated based on a first value obtained by a combination of the MAC address and the password and a second value obtained by a combination of a time value and a seed value.

The second authentication unit may determine a time at which the second authentication unit requests the user terminal to send the second authentication data, according to an additional authentication policy.

The image processing apparatus may further include a synchronizer configured for synchronization with an apparatus of providing the second authentication data to the user terminal.

The second authentication unit may generate the second reference data in response to a request for setting the additional authentication from the user terminal, and provide the second reference data to the user terminal, and the second authentication unit may set the additional authentication in response to a setting for using the second reference data from the user terminal.

An authentication apparatus according to an embodiment of the disclosure includes: a synchronizer configured for synchronization with an image processing apparatus; and an authentication data generator configured to receive a request for authentication data from a user terminal, and to generate authentication data based on a MAC address of the image processing apparatus and a password of the user terminal set in the image processing apparatus.

The authentication data generator may generate the authentication data based on the MAC address and the password included in the request for the authentication data.

The authentication data generator may generate the authentication data based on the MAC address and the password pre-stored in a storage device.

The authentication data may be generated based on a first value obtained by a combination of the MAC address and the password and a second value obtained by a combination of a time value and a seed value.

The authentication apparatus may be included in the user terminal.

A user authentication method of an image processing apparatus, according to an embodiment of the disclosure, including: requesting a user terminal to send first authentication data and receiving the first authentication data from the user terminal, by the image processing apparatus; determining whether the first authentication data matches pre-stored first reference data;

determining whether additional authentication is set up, when the first authentication data matches the first reference data; requesting the user terminal to send second authentication data, when the additional authentication is set up, and receiving the second authentication data from the user terminal; determining whether the second authentication data matches second reference data newly generated; and authenticating the user terminal when the second authentication data matches the second reference data.

The first reference data may include a password of a user terminal set in the image processing apparatus.

The second reference data may be generated based on a MAC address of the image processing apparatus and a password of a user terminal set in the image processing apparatus.

The second reference data may be generated based on a first value obtained by a combination of the MAC address and the password and a second value obtained by a combination of a time value and a seed value.

The user authentication method may further include: requesting an authentication apparatus to send the second authentication data in response to a request for the second authentication data from the image processing apparatus, by the user terminal; and receiving the second authentication data from the authentication apparatus, and providing the second authentication data to the image processing apparatus, by the user terminal.

The user authentication method may further include generating the second authentication data based on a MAC address of the image processing apparatus included in the request for the second authentication data and a password of the user terminal set in the image processing apparatus, by the authentication apparatus.

The user authentication method may further include: generating the second authentication data based on a MAC address of the image processing apparatus pre-stored in a storage device and a password of the user terminal set in the image processing apparatus, by the authentication apparatus.

The user authentication method may further include: generating the second reference data in response to a request for setting the additional authentication, received from the user terminal, and providing the second reference data to the user terminal, by the image processing apparatus; and setting the additional authentication in response to a setting for using the second reference data from the user terminal, by the image processing apparatus.

Advantageous Effects of Disclosure

Embodiments of the disclosure may enhance security by performing multi-password authentication through a combination of a password set by a user and a one-time password changing periodically.

BEST MODE

Figure 1:
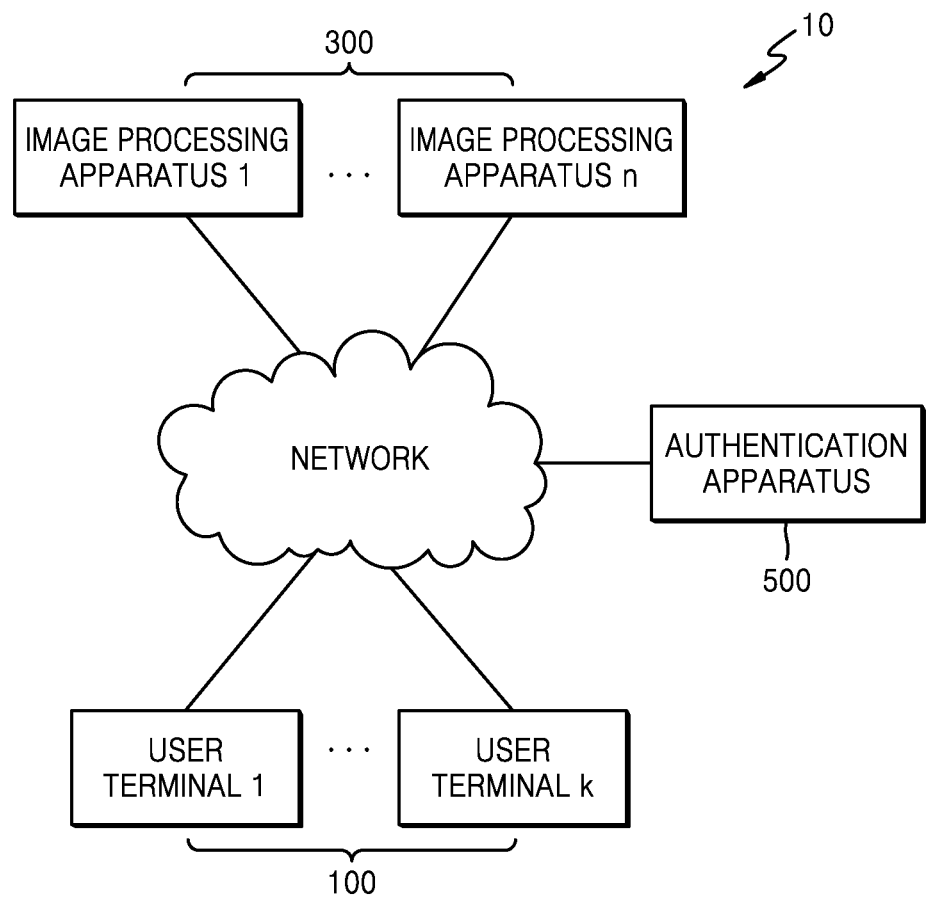
FIGS. 1 and 2 schematically show a security system according to an embodiment of the disclosure.

An image processing apparatus according to an embodiment of the disclosure includes: a first authentication unit configured to receive first authentication data from a user terminal, and to determine whether the first authentication data matches pre-stored first reference data to authenticate the user terminal; and
a second authentication unit configured to generate, when additional authentication is set up, second reference data, to request the user terminal to send second authentication data, to receive the second authentication data from the user terminal, and to determine whether the second authentication data matches the second reference data to authenticate the user terminal.

MODE OF DISCLOSURE

The principle of the disclosure will be described below. Therefore, although not specifically described and depicted in the specification, a person having the ordinary skill in the art may realize the principle of the disclosure and may invent various apparatuses within the concept and scope of the disclosure. Further, in principle, conditional terms and embodiments mentioned in the specification shall be obviously intended to understand the concept of the disclosure and may not limit the scope of the embodiments and states. Further, it shall be understood that all detailed descriptions, which teach a specific embodiment as well as a principle, an aspect and embodiments of the disclosure, are intended to include structural and functional equivalents. Further, it should be understood that the equivalents may include equivalents to be developed in the future as well as known equivalents and may include all devices invented for performing the same functions regardless of the structure thereof.

Functions of various devices shown in drawings including a processor or a function block expressed as a concept similar to the processor may be provided by using hardware capable of executing suitable software as well as dedicated hardware. When the functions are provided by the processor, the functions may be provided by a single dedicated processor, a single shared processor, or a plurality of individual processors and a part of the functions may be shared. It should be understood that use of a processor, a control or the term presented as a similar concept to the processor and the control shall not be interpreted as exclusively referring to hardware capable of executing software but shall be understood that it implicitly includes a digital signal processor (DSP), ROM, RAM, and non-volatile memory storing hardware and software. Other hardware generally known in the art may be included.

The above objects, features, and advantages can be more clearly comprehended through the following description in relation to accompanying drawings. In the following description, if detailed description about well-known functions or configurations may make the subject matter of the disclosure unclear, the detailed description will be omitted or the description will be briefly provided.

Meanwhile, it will be understood that when a certain part "includes" a certain component, the part does not exclude another component but can further include another component, unless the context clearly dictates otherwise.

Hereinafter, the disclosure according to preferred embodiments will be described in detail with reference to the accompanying drawings.

Figure 2:
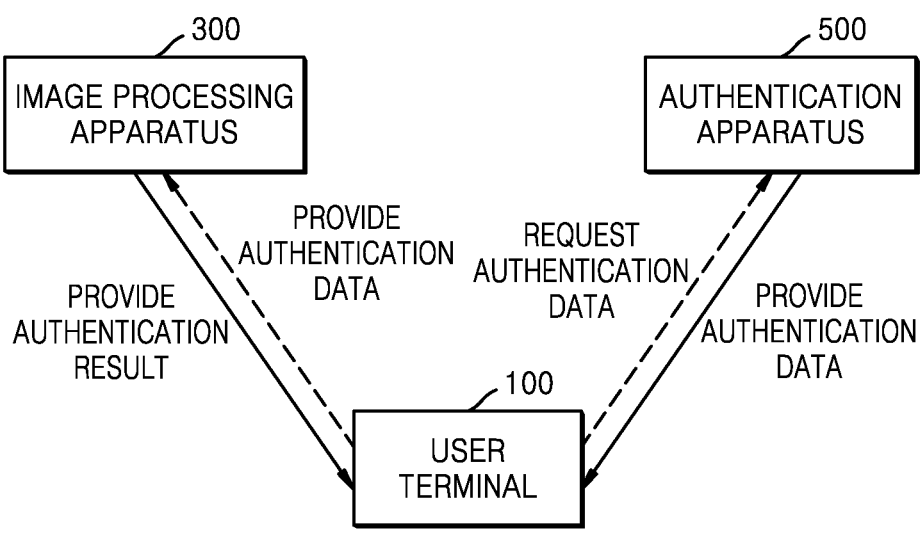

FIGS. 1 and 2 schematically show a security system according to an embodiment of the disclosure.

Referring to FIG. 1, a security system 10 according to an embodiment of the disclosure may include a user terminal 100, an image processing apparatus 300, and an authentication apparatus 500. The user terminal 100, the image processing apparatus 300, and the authentication apparatus 500 may be connected to each other through a wired and/or wireless network. The wireless network may include a wireless internet (for example, 3Generation (3G), 4Generation (4G (LTE)), Wireless-Fidelity (Wi-Fi), Wireless Broadband Internet (Wibro), Worldwide Interoperability for Microwave Access (Wimax), etc.), short-range communication (for example, Bluetooth, Radio Frequency Identification (RFID), Infrared Data Association (IrDA), Ultra Wideband (UWB), ZigBee, etc.), Wi-Fi, and LTE communication.

The user terminal (user terminals 1 to k) 100 may access the image processing apparatus 300 to search or request an image. The user terminal 100 may provide authentication data to the image processing apparatus 300, and when authentication is successful, the user terminal 100 may access the image processing apparatus 300. When additional authentication is set up in the image processing apparatus 300, the user terminal 100 may provide additional authentication data to the image processing apparatus 300, and when authentication is successful, the user terminal 100 may access the image processing apparatus 300.

The user terminal 100 may acquire the additional authentication data through the authentication apparatus 500, and transmit the additional authentication data to the image processing apparatus 300, thereby requesting the image processing apparatus 300 to perform authentication. Referring to FIG. 2, the user terminal 100 may request the authentication apparatus 500 to send the additional authentication data, and acquire the additional authentication data from the authentication apparatus 500. The user terminal 100 may provide the additional authentication data to the image processing apparatus 300, and receive an authentication result from the image processing apparatus 300.

The user terminal 100 may be a mobile terminal (for example, a laptop computer, a hand-held device, a smart phone, a tablet computer, etc.), a desktop computer, or an arbitrary proper device using the above-mentioned device or connected directly or indirectly to the device. The user terminal 100 may be a management apparatus that monitors the image processing apparatus 300.

The image processing apparatus (image processing apparatuses 1 to n) 300 may provide an image and/or an image analysis result to the user terminal 100 which has been registered in and authenticated by the image processing apparatus 300.

The image processing apparatus 300 may determine validity of authentication data received from the registered user terminal 100 to authenticate the user terminal 100. When additional authentication is set up, the image processing apparatus 300 may request the user terminal 10 to send additional authentication data, and determine validity of additional authentication data received from the user terminal 100.

When an additional authentication condition is satisfied according to an additional authentication policy, the image processing apparatus 300 may perform additional authentication. For example, the image processing apparatus 300 may perform additional authentication whenever the user terminal 100 requests access to the image processing apparatus 300, periodically at predetermined time intervals, or when a specific function such as an image search is performed.

The image processing apparatus 300 may compare the authentication data input by the user terminal 100 with authentication data pre-stored in the image processing apparatus 300 or newly generated by the image processing apparatus 300 to perform authentication of the user terminal 100.

The image processing apparatus 300 may be a camera, a digital video recorder (DVR), a network video recorder (NVR), etc. At least one part of components constituting the image processing apparatus 300 may be implemented as software or circuits including at least one of an operating system, an application program module, and another program module. The image processing apparatus 300 may be implemented as a chip installed in a camera, a DVR, or a NVR, or as a circuit board including the chip.

The authentication apparatus 500 may be synchronized with the image processing apparatus 300. The authentication apparatus 500 may receive a request for authentication data from the user terminal 100, generate authentication data based on information included in the request for authentication data, and provide the authentication data to the user terminal 100.

The authentication apparatus 500 and the image processing apparatus 300 may access a time server to perform time synchronization. The time server may be a NTP time server or a time server established on a local network.

The authentication apparatus 500 is shown as a single apparatus in FIG. 1, however, the authentication apparatus 500 may be not necessarily implemented as a single physical apparatus. That is, a plurality of components (portions) constructing the authentication apparatus 500 may be organically coupled with each other to be implemented as a single module, or distributed into different physical apparatuses, wherein the distributed components may be organically coupled with each other to perform functions and/or operations defined in the present specification.

For convenience of description, hereinafter, authentication data pre-stored in the image processing apparatus 300 or newly generated by the image processing apparatus 300, which is to be compared with authentication data received from the user terminal 100, is referred to as reference data.

Figure 3:
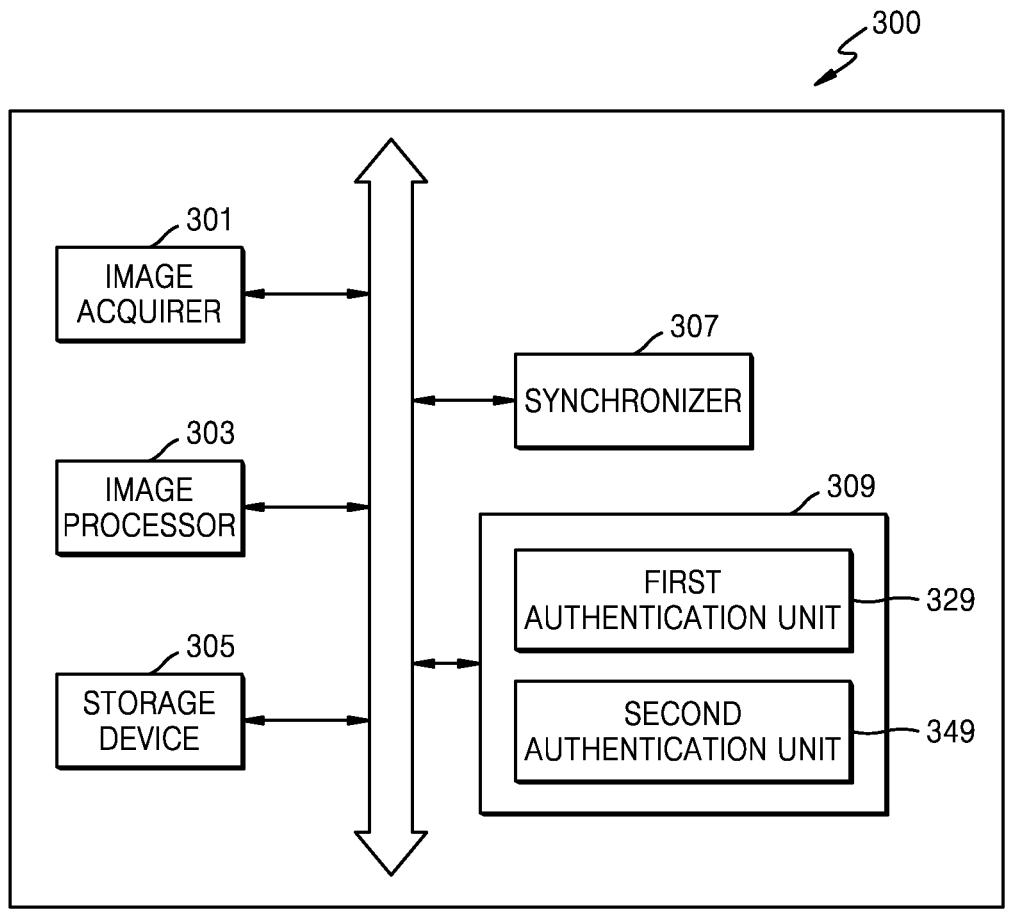
FIG. 3 is a block diagram schematically showing a configuration of an image processing apparatus according to an embodiment of the disclosure.

FIG. 3 is a block diagram schematically showing a configuration of an image processing apparatus according to an embodiment of the disclosure.

Referring to FIG. 3, the image processing apparatus 300 may include an image acquirer 301, an image processor 303, a storage device 305, a synchronizer 307, and an authentication unit 309.

The image acquirer 301 may itself acquire an image, or may acquire an image through a network from an outside. When the image processing apparatus 300 is a camera, the image acquirer 301 may include an image sensor, and itself acquire an image by using the image sensor. When the image processing apparatus 300 is DVR or NVR, the image acquirer 301 may acquire an image from a camera or another device through a network.

The image processor 303 may perform signal processing for picture quality improvement, such as noise removal, gamma correction, color filter array interpolation, color correction, color enhancement, etc., on an image. The image processor 303 may perform image analysis, and when a predetermined event generation condition is satisfied, the image processor 303 may generate an event. The image processor 303 may generate meta data representing an image analysis result.

The storage device 305 may store the image and the image analysis result such as metadata. The image processor 303 may structuralize and arrange the meta data in order to facilitate an image search, and then store the meta data in the storage device 305. The storage device 305 may store the reference data.

The synchronizer 307 may synchronize the image processing apparatus 300 with an external device connected to the image processing apparatus 300 through a network. The synchronizer 307 may synchronize the image processing apparatus 300 with the authentication apparatus 500.

The authentication unit 309 may determine validity of authentication data received from the user terminal 100 to authenticate the user terminal 100, that is, a user. The authentication unit 309 may determine validity of the authentication data by comparing the authentication data to the reference data.

The authentication unit 309 may include a first authentication unit 329 and a second authentication unit 349.

The first authentication unit 329 may receive authentication data (hereinafter, referred to as 'first authentication data') input by the user terminal 100, and determine whether the first authentication data matches first reference data to primarily authenticate the user terminal 100.

The first reference data may be authentication data that is to be compared to the first authentication data, and may be an identification code of the user terminal 100, that is, the user. For example, the first reference data may include a password of the user terminal 100 registered in advance in the image processing apparatus 300. The first reference data may further include an ID of the user terminal 100. The ID and password of the user terminal 100 may be maintained as fixed values unless the user changes and registers the ID and password.

When the first reference data is changed by the user, the changed first reference data may be registered and stored in the storage device 305. The first reference data may be configured with a combination of a character, a figure, a symbol, etc. The first authentication unit 329 may compare the first authentication data input by the user terminal 100 with the first reference data to verify the first authentication data. When the first authentication data matches the first reference data, the first authentication unit 329 may authenticate the user.

The second authentication unit 349 may receive additional authentication data (hereinafter, referred to as 'second authentication data') input by the user terminal 100, and determine whether the second authentication data matches second reference data to additionally authenticate the user terminal 100.

The second reference data may be authentication data that is to be compared to the second authentication data, and may be a one-time code changing over time. For example, the second reference data may be a one-time password (OTP) generated by using a plurality of variables. The variables may include a MAC address which is a unique value of the image processing apparatus 300, a password of the user terminal 100 set in the image processing apparatus 300, a time value, and a seed value. The second reference data may be configured with a combination of a character, a figure, a symbol, etc. The image processing apparatus 300 may compare the second authentication data input by the user terminal 100 with the second reference data to verity the second authentication data. When the second authentication data matches the second reference data, the second authentication unit 349 may additionally authenticate the user. The user terminal 100 may acquire the second authentication data from the authentication apparatus 500.

The authentication unit 309 may determine a time at which the authentication unit 309 requests the user terminal 100 to send second authentication data, according to an additional authentication policy. For example, additional authentication may be performed when the user terminal 100 requests access, periodically at predetermined time intervals, or when a predetermined function such as an image search is performed.

According to an embodiment, when the user terminal 100 requests access, the second authentication unit 349 may determine whether additional authentication is set up, when primary authentication of the first authentication unit 329 is successful, and request the user terminal 100 primarily authenticated to send second authentication data. According to another embodiment, when the user terminal 100 requests access, the first authentication unit 329 may determine whether additional authentication is set up, when primary authentication is successful, and activate additional authentication of the second authentication unit 349.

The second authentication unit 349 may request a part of the first authentication data, when requesting the second authentication data.

The authentication unit 309 may be implemented as a server. For example, the authentication unit 309 may be implemented as a web server to provide a web page for providing an authentication service to the user terminal 100. According to another example, the authentication unit 309 may be implemented as a web application server to provide a web page to the user terminal 100, thereby providing an authentication application execution environment.

In the embodiment of FIG. 3, the first authentication unit 320 and the second authentication unit 349 are separated to perform independent functions. However, a single authentication unit may perform both primary authentication and additional authentication.

Figure 4:
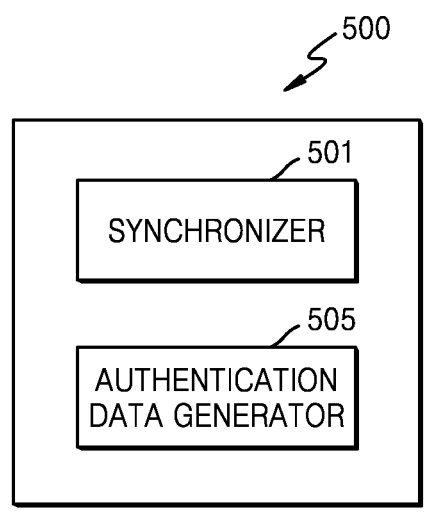
FIG. 4 is a block diagram schematically showing a configuration of an authentication apparatus according to an embodiment of the disclosure.

FIG. 4 is a block diagram schematically showing a configuration of an authentication apparatus according to an embodiment of the disclosure.

Referring to FIG. 4, the authentication apparatus 500 may include a synchronizer 501 and an authentication data generator 505.

The synchronizer 501 may synchronize the authentication apparatus 500 with an external apparatus connected to the authentication apparatus 500 through a network. The synchronizer 501 may synchronize the authentication apparatus 500 with the image processing apparatus 300.

The authentication data generator 505 may receive a request for second authentication data from the user terminal 100, generate the second authentication data, and provide the second authentication data to the user terminal 100. The request for the second authentication data may include a variable required for generating the second authentication data. The authentication data generator 505 may generate the second authentication data based on the variable acquired from the user terminal 100. The variable provided from the user terminal 100 may include a MAC address which is a unique value of the image processing apparatus 300, and a password of the user terminal 100 set in the image processing apparatus 300. The authentication data generator 505 may use a time value and a seed value as additional variables. The authentication data generator 505 may not use the password of the user terminal 100 received from the user terminal 100 for other purposes except for a purpose for generating authentication data, and may not store the password.

A second authentication data generation algorithm of the authentication data generator 505 may be the same as a second reference data generation algorithm of the image processing apparatus 300.

The authentication apparatus 500 may be implemented as a module in the form of hardware or as a server in the form of software. The authentication apparatus 500 may be implemented in the user terminal 100 or in a separate apparatus. Also, the authentication apparatus 500 may be implemented as a software development kit (SDK).

For example, the authentication unit 500 may be implemented as a web server to provide a web page for providing an authentication data issuing service to the user terminal 100. According to another example, the authentication unit 500 may be implemented as a web application server to provide the user terminal 100 with a web page for executing an authentication data issuing application. According to another example, the authentication apparatus 500 may interwork with a SMS server to provide authentication data to the user terminal 100 through the SMS server.

When the user terminal 100 or an apparatus including the authentication apparatus 500 already knows a MAC address of the image processing apparatus 300 and a password of the user terminal 100 for access to the image processing apparatus 300 in advance, the authentication apparatus 500 may be implemented as an automatic issuance server. In this case, the user may himself/herself need not to input the MAC address and the password, which provides a user convenience while enhancing security.

Figure 5A:
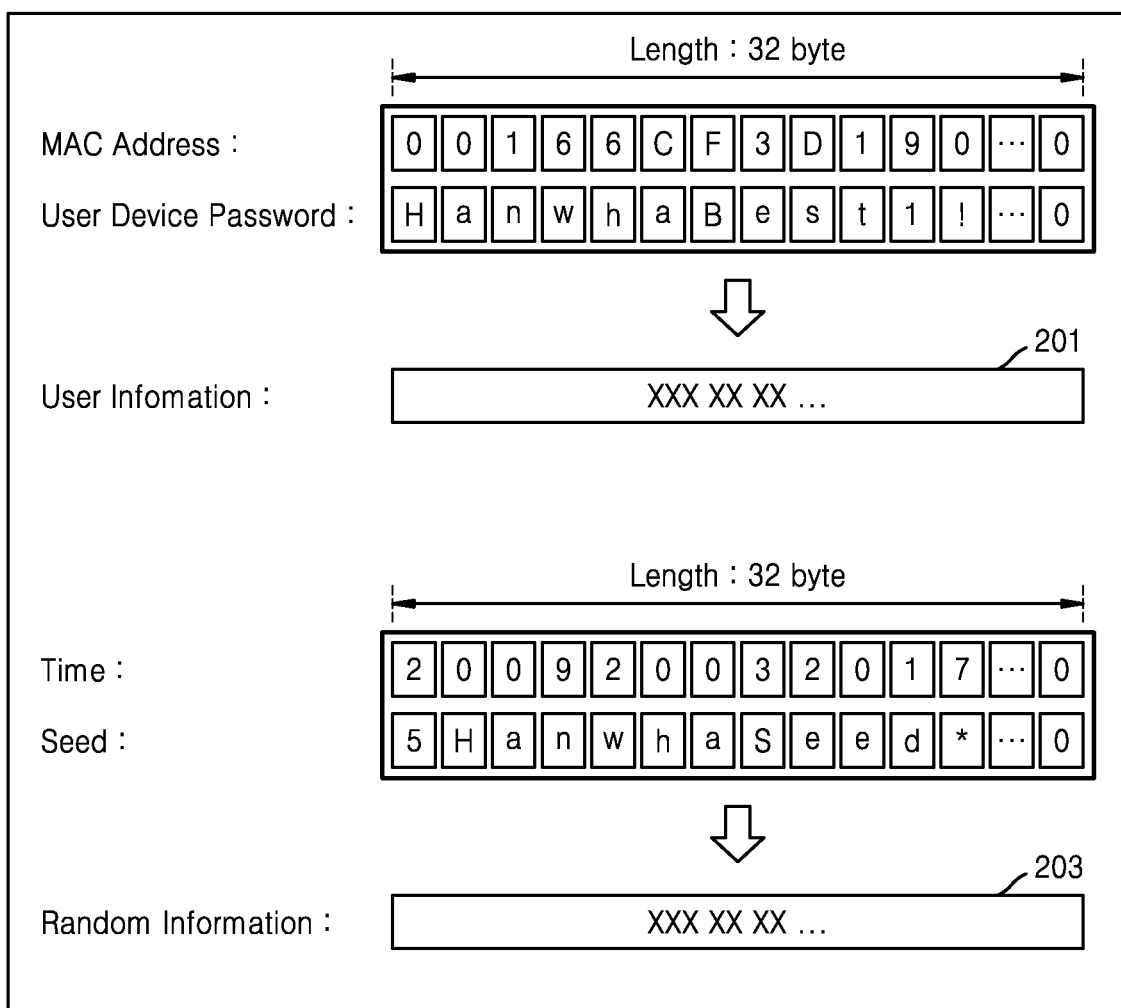
FIGS. 5A to 5B show an example for describing a method of generating second authentication data in an image processing apparatus and second reference data in an authentication apparatus.
Figure 5B:
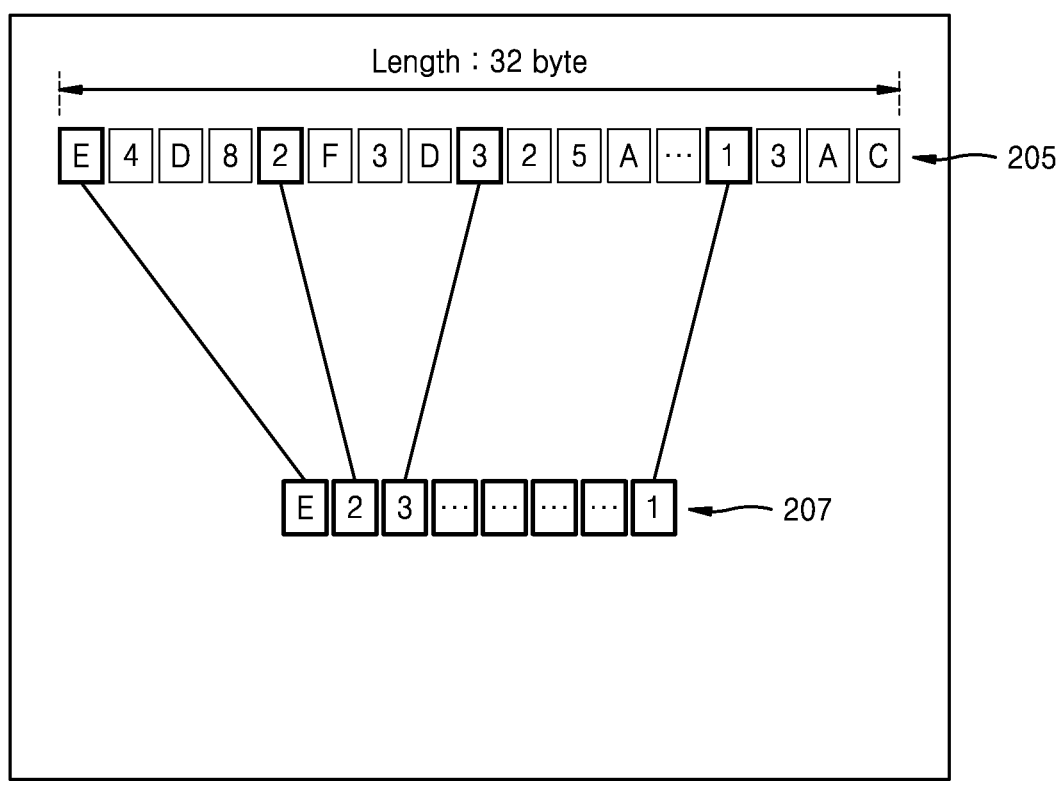

FIGS. 5A to 5B show an example for describing a method of generating second authentication data in an image processing apparatus and second reference data in an authentication apparatus. The image processing apparatus 300 and the authentication apparatus 500 may generate second authentication data and second reference data, respectively, using the same algorithm. Also, the image processing apparatus 300 may be time synchronized with the authentication apparatus 500 to perform the same algorithm. Hereinafter, for convenience of description, the method will be described as operations of an authentication data generating apparatus, and the authentication data generating apparatus may be applied in the same way to the image processing apparatus 300 and the authentication apparatus 500.

Referring to FIG. 5A, the authentication data generating apparatus may combine a MAC address of the image processing apparatus 300 with a password (user device password (UDP)) of the user terminal 100 set in the image processing apparatus 300 to generate a first value 201 as user information.

For example, when the MAC address is "00:16:6C:F3:D1:90", '0' and 'H' may be added to "00166CF3D190" obtained by removing a periodic separator ":" from the MAC address to generate a conversion value of 32 bytes. Likewise, when the password is "HanwhaBest1 !", '0' and 'H' may be added to "HanwhaBest1 !" to generate a conversion value of 32 bytes. By adding the conversion value of the MAC address to the conversion value of the password, an arbitrary first value 201 may be generated.

Then, the authentication data generating apparatus may combine a time value with a seed value to generate a second value 203 as random information.

For example, when the time value is "2017 03 20 09 05", the time value may be converted by a time conversion rule and then added with '0' and 'H' to generate a conversion value of 32 bytes. A character string for the time value may be arranged in the order of "minute/hour/day/month/year" so that a random value may be generated periodically. A time may be converted at predetermined maintenance time intervals from an initial time. The maintenance time may be limited to 5 minutes in consideration of a user input time. For example, when the initial time is 12 o'clock and a current time value is "220920032017", the time value may be converted to "200920032017". The time value "200920032017" may be maintained for 5 minutes, and after 5 minutes elapse, the time value may change to "250920032017". The seed value may be assigned to each user or assigned in common to image processing apparatuses 300 manufactured from the same manufacturing company. When the seed value is "5HanwhaSeed*", '0' and 'H' may be added to the seed value to generate a conversion value of 32 bytes. By adding the conversion value of the time value to the conversion value of the seed value, an arbitrary second value 203 may be generated.

Referring to FIG. 5B, the authentication data generating apparatus may apply a predetermined algorithm to the first value 201 and the second value 203 to generate a new value, and convert the new value to a Hash value to generate a character string 205 of 32 bytes being a hexadecimal number. For example, the authentication data generating apparatus may apply a Message-Digest algorithm 5 (MD5) algorithm.

The authentication data generating apparatus may extract a value of a specific place from the character string 205 of 32 bytes to generate a final value 207 of 8 bytes as authentication data. By limiting the final value to an appropriate length, a user's input inconvenience may be removed. In FIG. 5B, by combining values of 0th, 4th, 8th, . . . places, the final value 207 may be generated.

Because the time value changes periodically, authentication data generated by the authentication data generating apparatus may also change periodically.

The embodiment of the disclosure may generate a one-time password by using a user's unique information such as a password of the user terminal 100 in addition to a MAC address of the image processing apparatus 300 that can be easily acquired online, thereby further enhancing security.

The embodiment of the disclosure may apply another algorithm than the algorithm shown in FIGS. 5A and 5B to the MAC address, the password of the user terminal, the time value, and the seed value to generate authentication data. Also, the variables may be exemplary. Three variables of a MAC address, a password of a user terminal, and a time value may be used, or another variable than the three variables may be added.

Figure 6:
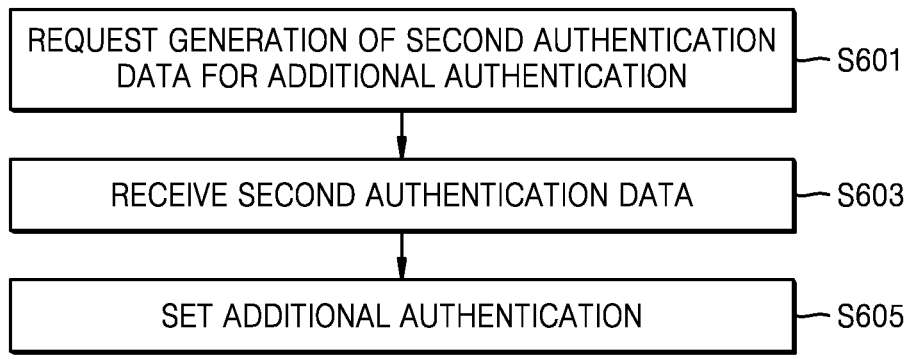
FIG. 6 is a flowchart for describing an additional authentication setting method for access to an image processing apparatus according to an embodiment of the disclosure.
Figure 7A:
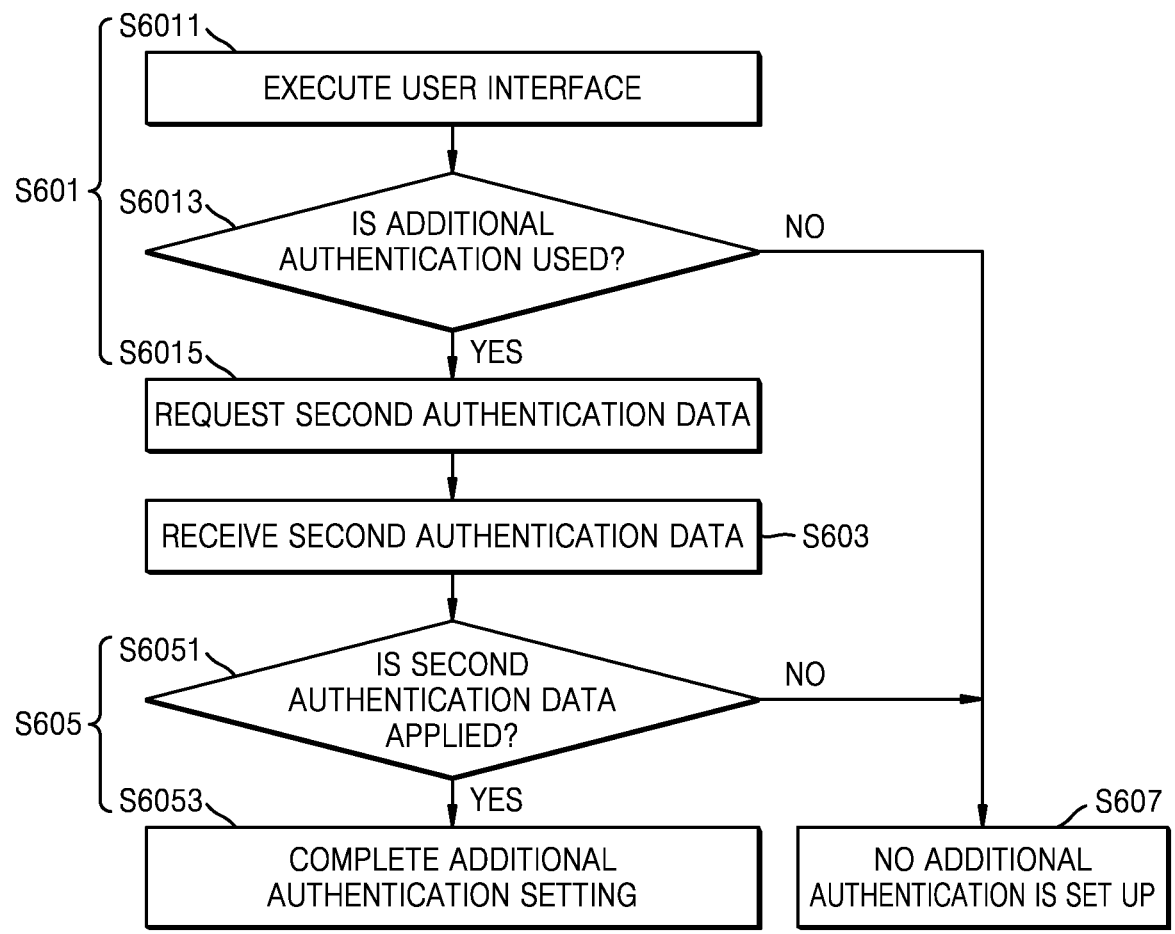
FIGS. 7A to 7C show an example of the additional authentication setting method of FIG. 6.
Figure 7B:
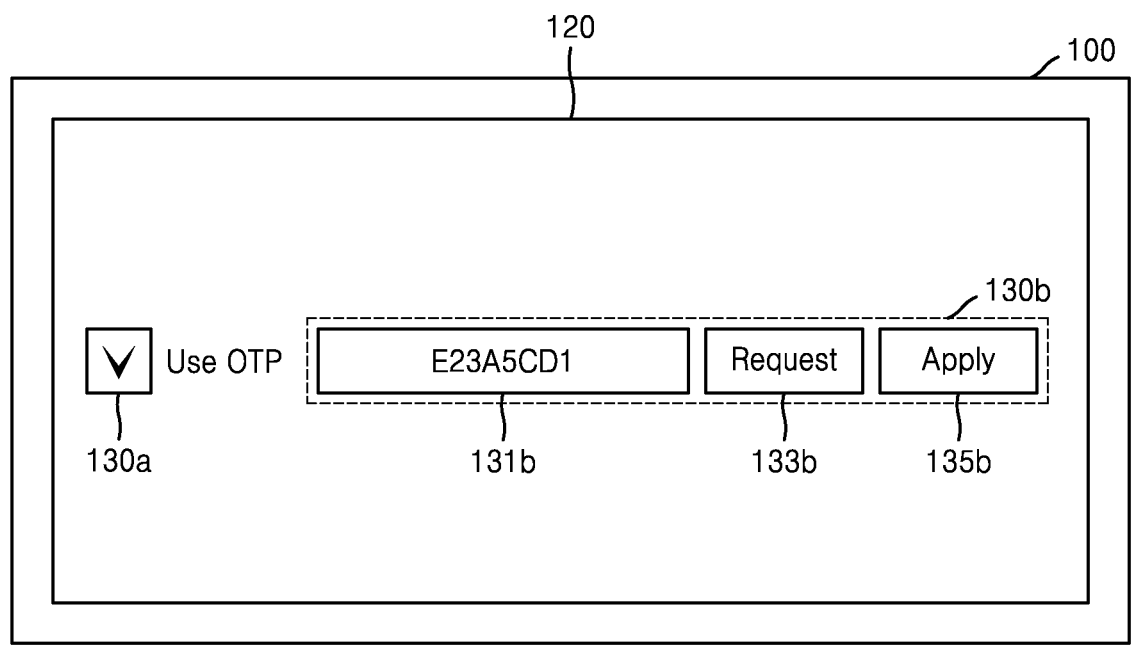
Figure 7C:
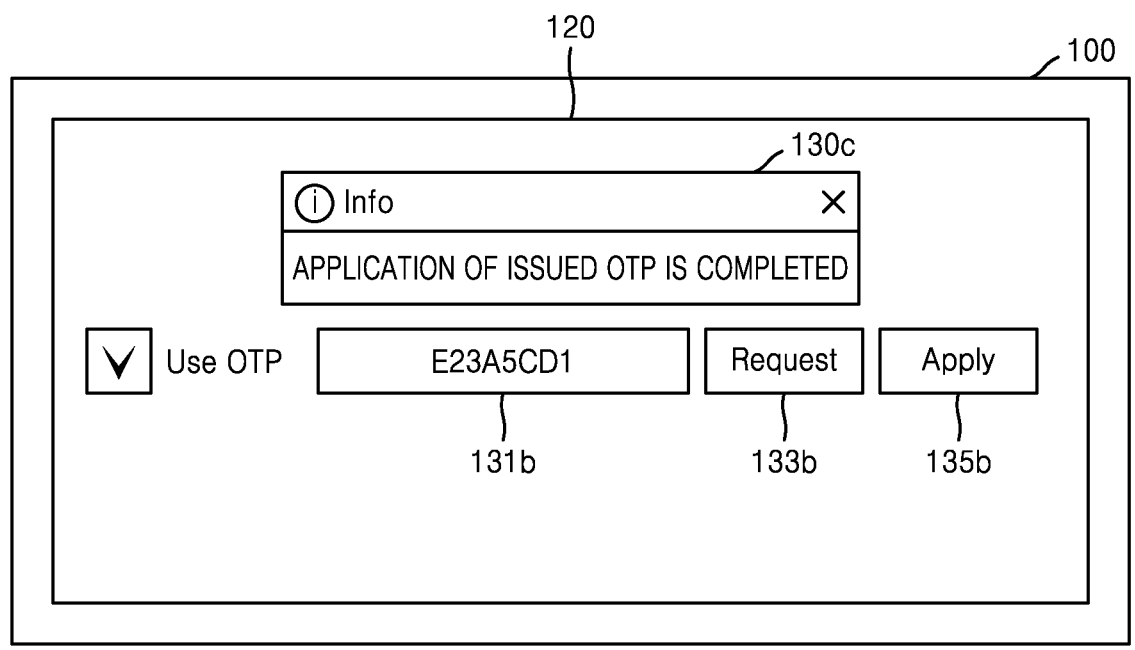

FIG. 6 is a flowchart for describing an additional authentication setting method for access to an image processing apparatus according to an embodiment of the disclosure. FIGS. 7A to 7C show an example of the additional authentication setting method of FIG. 6.

The user terminal 100 may receive an additional authentication request from a user, and request the image processing apparatus 300 to generate second authentication data, in operation S601. The user terminal 100 may have been connected to the image processing apparatus 300.

The user may execute a user interface on the user terminal 100, in operation S6011. Referring to FIG. 7B, the image processing apparatus 300 may provide the user terminal 100 with a window 120, such as a web page, an app page, etc., for setting additional authentication, according to a type of the user interface.

The user may select whether to use additional authentication in the window 120 provided on the user terminal 100, in operation S6013. Referring to FIG. 7B, when the user selects use 130a of additional authentication, an additional authentication item 130b which has been inactive may be activated. In the additional authentication item 130b, a Request button 133b and an Apply button 135b may be provided. When the user does not select use 130a of additional authentication, no additional authentication may be set up, in operation S607.

The user may request the image processing apparatus 300 to send second authentication data in the window 120 provided on the user terminal 100, in operation S6015. Referring to FIG. 7B, the user may select the Request button 133b of the additional authentication item 130b to request the image processing apparatus 300 to send second authentication data for additional authentication.

The user terminal 100 may receive second authentication data from the image processing apparatus 300, in operation S603. Referring to FIG. 7B, the image processing apparatus 300 which has received the request for the second authentication data may generate the second authentication data, and provide the second authentication data to an area 131*b* of the additional authentication item 130*b* provided on the user terminal 100.

The user terminal 100 may receive a request for applying the second authentication data from the user, and request the image processing apparatus 300 to set additional authentication, in operation S605.

The user may determine whether to apply the second authentication data received from the image processing apparatus 300 to additional authentication, in operation S6051, and complete an additional authentication setting, in operation S6053. Referring to FIG. 7C, when the user selects the Apply button 135*b* for applying the second authentication data, an additional authentication setting of the image processing apparatus 300 may be completed. The image processing apparatus 300 may inform a user that additional authentication is set up, through a pop-up window 130*c*.

When the user does not select the Apply button 135*b* for applying the second authentication data, no additional authentication may be set up, in operation S607. When no additional authentication is set up, authentication may be completed through primary authentication by verification on a validity of first authentication data.

Figure 8:
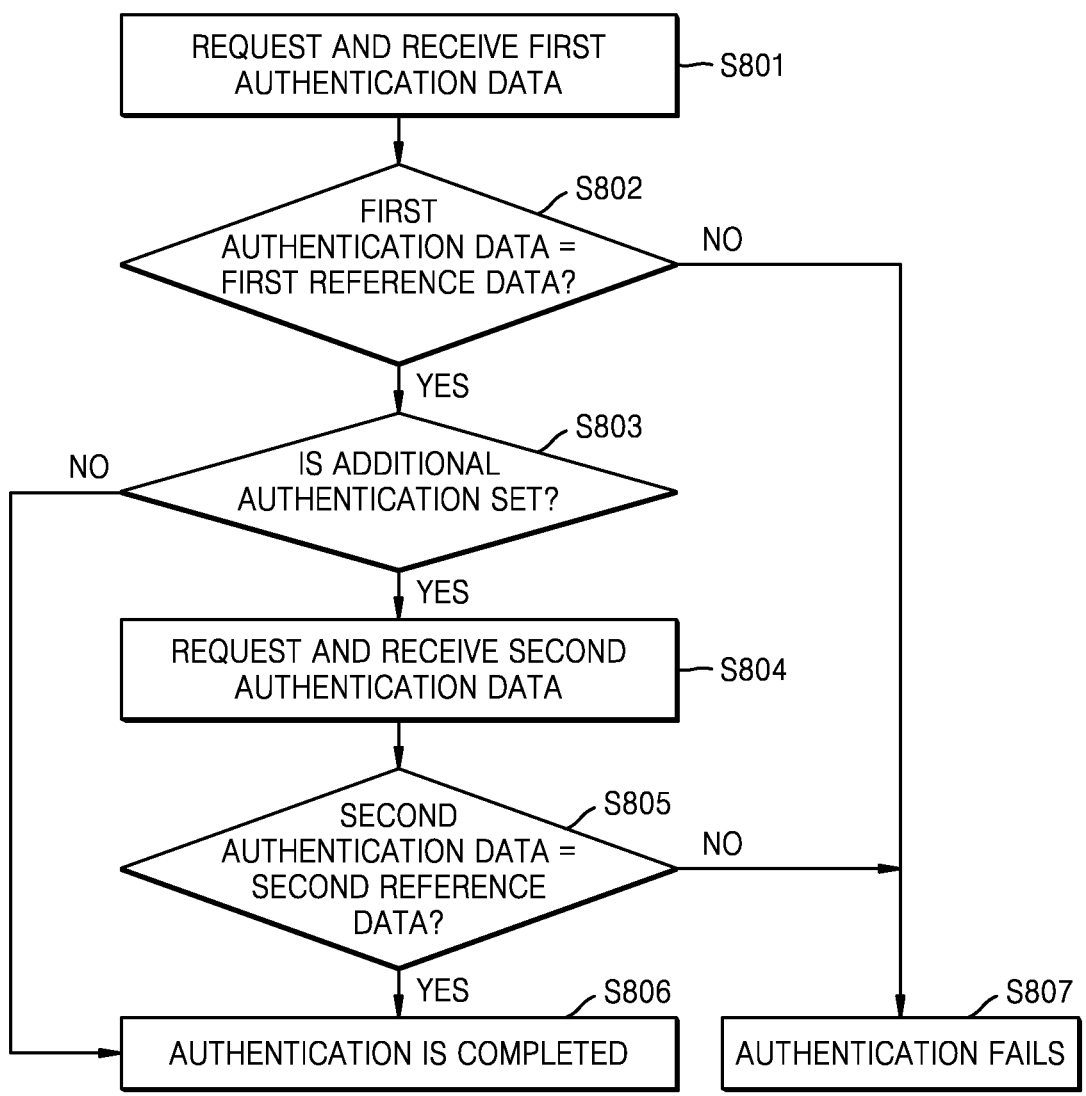
FIG. 8 is a flowchart for schematically describing an authentication method of a user terminal by an image processing apparatus according to an embodiment of the disclosure.

FIG. 8 is a flowchart for schematically describing an authentication method of a user terminal by an image processing apparatus according to an embodiment of the disclosure. FIGS. 9A to 9E show an example of the authentication method of FIG. 8.

The image processing apparatus 300 may request the user terminal 100 to send first authentication data, and receive the first authentication data from the user terminal 100, in operation S801.

Figure 9A:
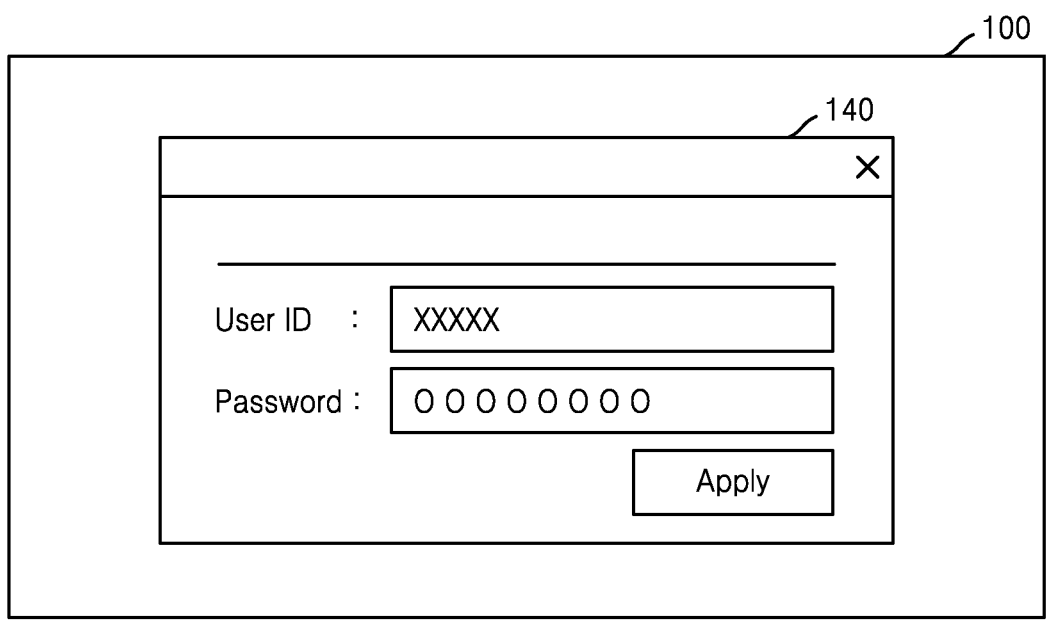
FIGS. 9A to 9E show an example of the authentication method of FIG. 8.

Referring to FIG. 9A, the image processing apparatus 300 may provide the user terminal 100 with a window 140 for enabling a user to input the first authentication data. The first authentication data may include a password of the user terminal 100. The user may input the first authentication data to the input window 140, and apply the first authentication data to transmit the first authentication data to the image processing apparatus 300.

The image processing apparatus 300 may determine whether the first authentication data matches first reference data to primarily authenticate the user terminal 100, in operation S802.

When the first authentication data does not match the first reference data, the image processing apparatus 300 may inform the user terminal 100 that authentication has failed, in operation S807. Accordingly, the user's login may be cancelled.

When primary authentication of the user terminal 100 is successful, the image processing apparatus 300 may determine whether additional authentication is set up, in operation S803. When no additional authentication is set up, the image processing apparatus 300 may inform the user terminal 100 that authentication is successful, in operation S806.

When additional authentication is set up, the image processing apparatus 300 may request the user terminal 100 to send second authentication data, and receive the second authentication data from the user terminal 100, in operation S804.

Figure 9B:
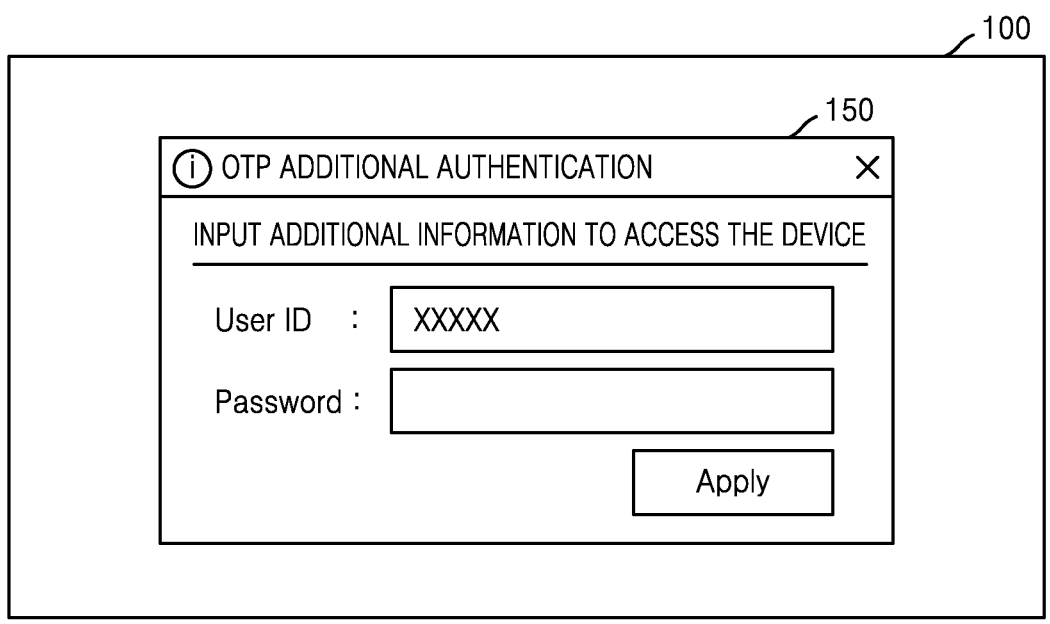

Referring to FIG. 9B, the image processing apparatus 300 may provide the user terminal 100 with a window 150 for enabling the user to input the second authentication data. A user ID input previously to the window 140 by the user may be provided in advance to the window 150.

Figure 9C:
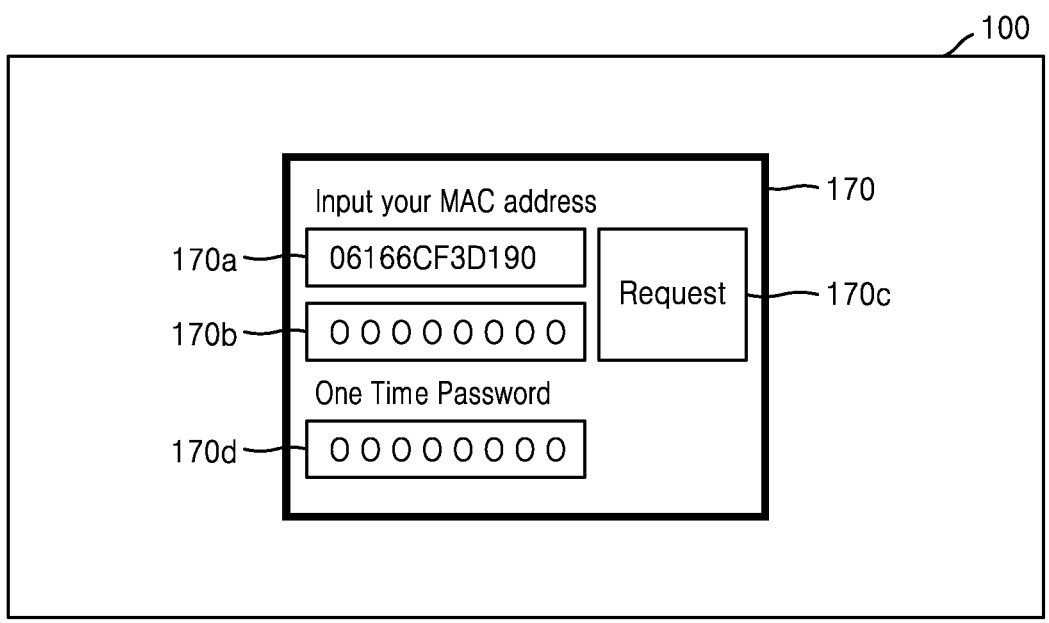

Referring to FIG. 9C, the user terminal 100 may request the authentication apparatus 500 to send the second authentication data. The user may execute a user interface for requesting the authentication apparatus 500 to send authentication data. The authentication apparatus 500 may provide the user terminal 100 with a window 170 for enabling the user to input data for generating the second authentication data. The user may input a MAC address 170*a* of the image processing apparatus 300 and a password of the user terminal 100 to the input window 170, and select a Request button 170*c* to transmit the MAC address 170*a* and the password 170*b* to the authentication apparatus 500. The authentication apparatus 500 may generate second authentication data 170*d* based on the MAC address 170*a* and the password 170*b*, and provide the second authentication data 170*d* to the user terminal 100.

Figure 9D:
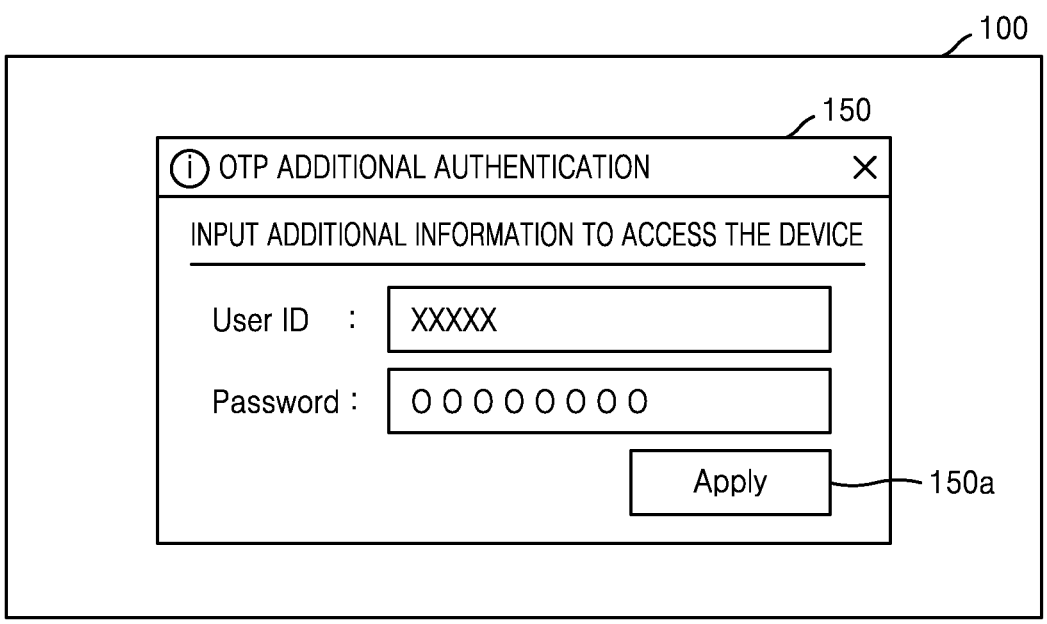

Referring to FIG. 9D, the user may input the second authentication data 170*d* acquired from the authentication apparatus 500 to a password input area of the window 150, and select an Apply button 150*a* to transmit the second authentication data 170*d* to the image processing apparatus 300. According to an embodiment, the image processing apparatus 300 may request the user to input both the first authentication data and the second authentication data 170*d* to password input areas of the window 150. At this time, an input order of the first authentication data and the second authentication data may follow a predetermined rule. According to another embodiment, the image processing apparatus 300 may provide the first authentication data in advance to the password input area of the window 150, and the user may input the second authentication data following the first authentication data.

Figure 9E:
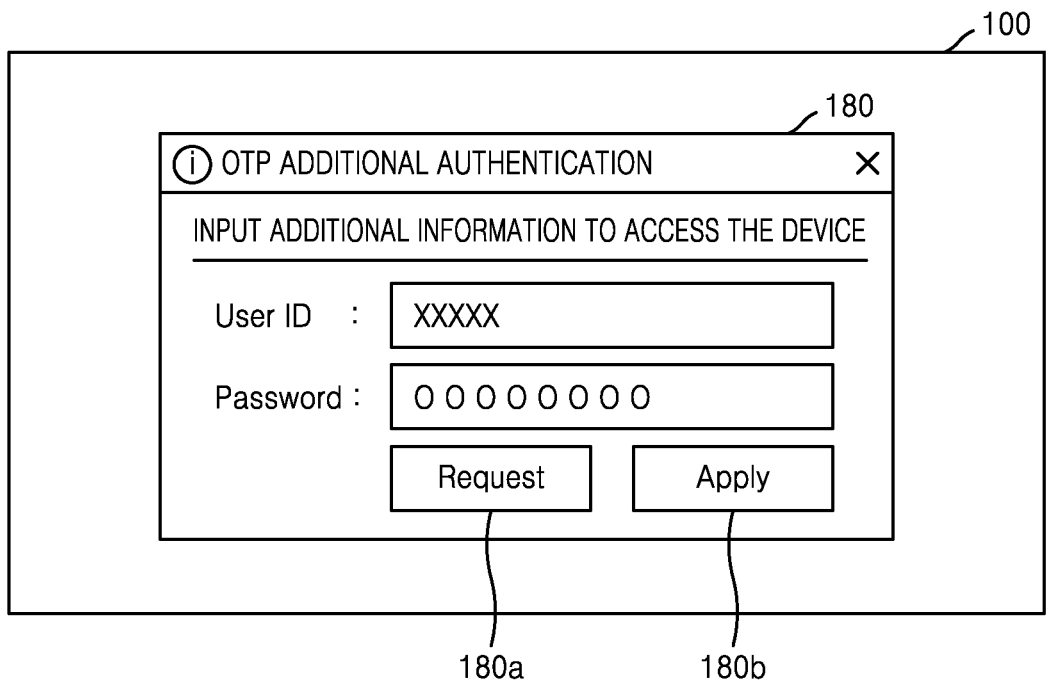

According to another example, referring to FIG. 9E, when the user terminal 100 includes the authentication apparatus 500, the user may select a Request button 180*a* in a second authentication data input window 180 provided by the image processing apparatus 300. In this case, the authentication apparatus 500 may generate the second authentication data and automatically provide the second authentication data to a password input area of the input window 180. The user may select an Apply button 180*b* to transmit the second authentication data to the image processing apparatus 300.

The image processing apparatus 300 may determine whether the second authentication data matches second reference data to additionally authenticate the user terminal 100, in operation S805.

When the second authentication data matches the second reference data, the image processing apparatus 300 may complete authentication of the user terminal 100, in operation S806.

When the second authentication data does not match the second reference data, the image processing apparatus 300 may inform the user terminal 100 that authentication has failed, in operation S807. Accordingly, the user's login may be cancelled.

Figure 10:
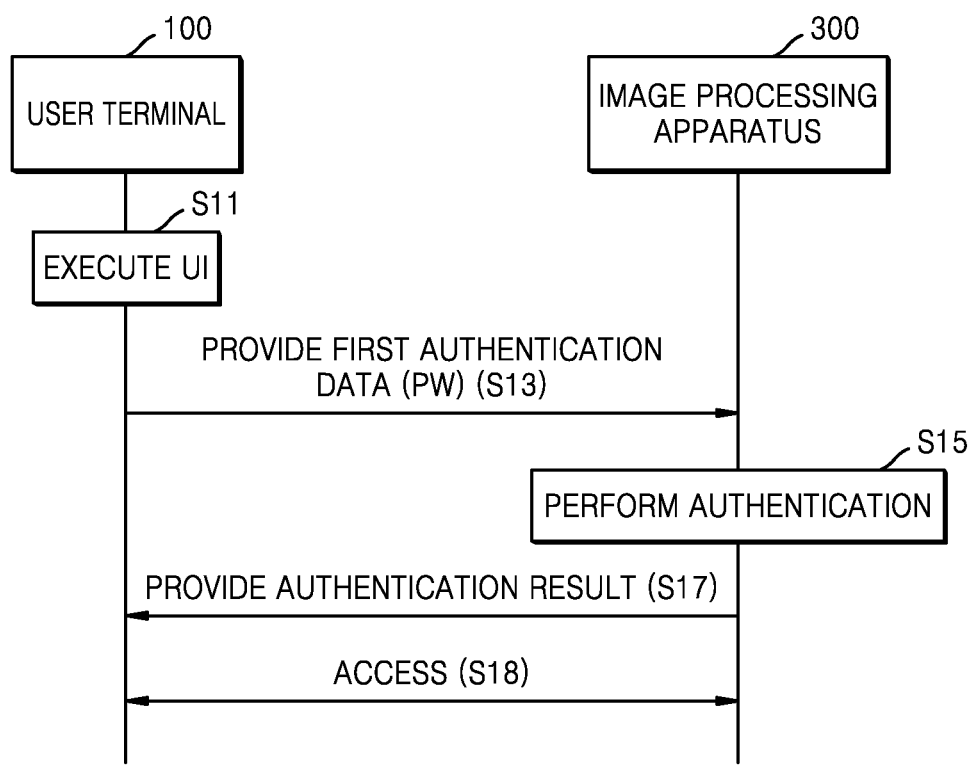
FIG. 10 is a view for describing a method in which a user terminal accesses an image processing apparatus according to an embodiment of the disclosure when no additional authentication is set up in the image processing apparatus.

FIG. 10 is a view for describing a method in which a user terminal accesses an image processing apparatus according to an embodiment of the disclosure when no additional authentication is set up in the image processing apparatus.

Referring to FIG. 10, the user terminal may execute a user interface for access to the image processing apparatus 300, in operation S11.

The user terminal 100 may provide first authentication data input by a user through the user interface to the image processing apparatus 300, in operation S13. The first authentication data may be a password PW of the user terminal 100. The first authentication data may further include ID of the user terminal 100.

The image processing apparatus 300 may determine whether the first authentication data matches first reference data to perform authentication, in operation S15.

The image processing apparatus 300 may provide a result of the authentication to the user terminal 100, in operation S17. The image processing apparatus 300 may determine whether additional authentication is set up, and when no additional authentication is set up, the image processing apparatus 300 may complete authentication of the user terminal 100 based on the result of the authentication performed in operation S15.

When the authentication is successful, the user terminal 100 may complete login to access the image processing apparatus 300, in operation S18.

Figure 11:
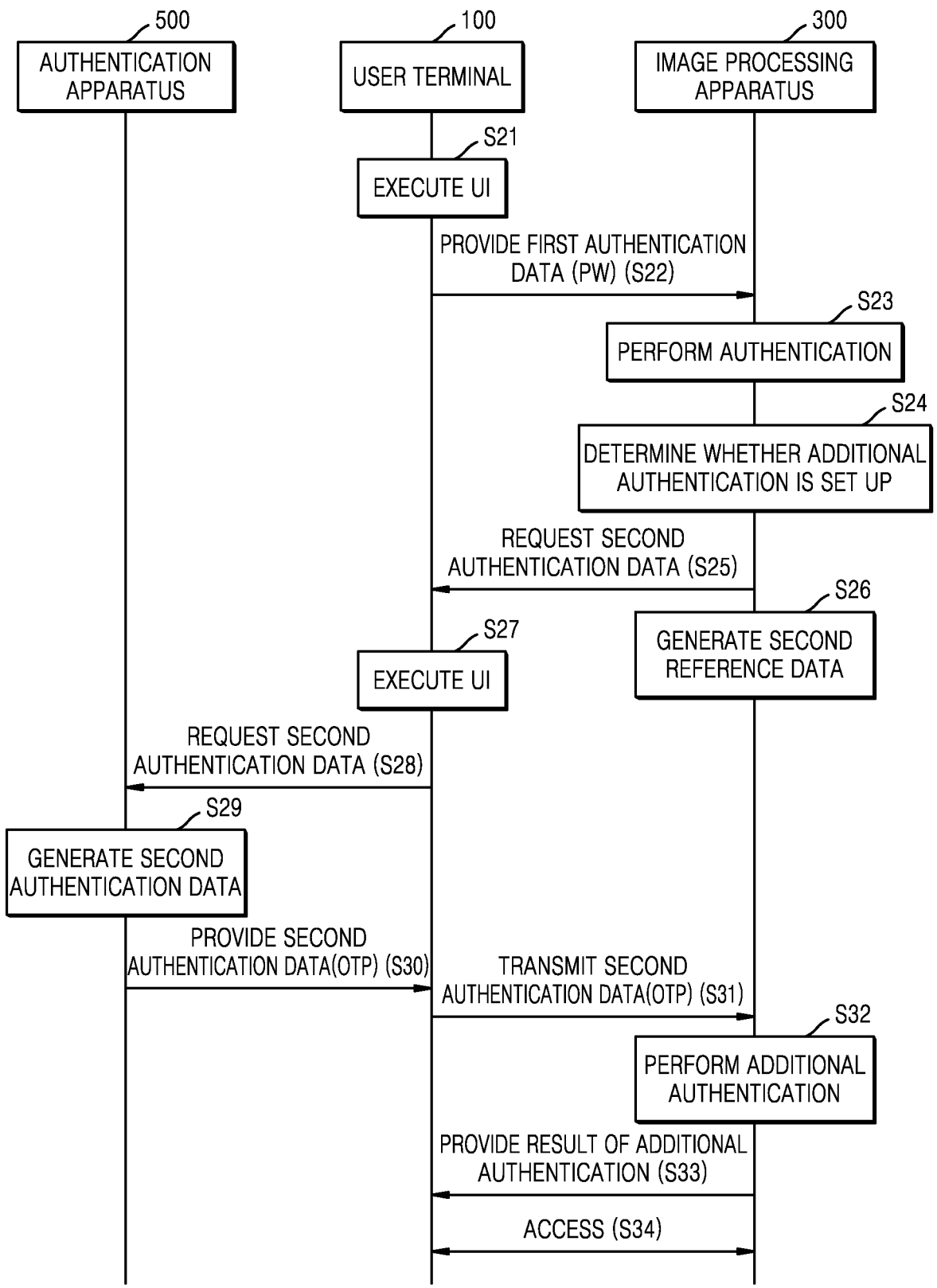
FIG. 11 is a view for describing a method in which a user terminal accesses an image processing apparatus according to an embodiment of the disclosure when additional authentication is set up in the image processing apparatus.

FIG. 11 is a view for describing a method in which a user terminal accesses an image processing apparatus according to an embodiment of the disclosure when additional authentication is set up in the image processing apparatus.

Referring to FIG. 11, the user terminal 100 may execute a user interface for access to the image processing apparatus 300, in operation S21.

The user terminal 100 may provide first authentication data input by a user through the user interface to the image processing apparatus 300, in operation S22. The first authentication data may be a password of the user terminal 100. The first authentication data may further include an ID of the user terminal 100.

The image processing apparatus 300 may determine whether the first authentication data matches the first reference data to perform primary authentication, in operation S23.

When the primary authentication is successful, the image processing apparatus 300 may determine whether additional authentication is set up, in operation S24. When additional authentication is set up, the image processing apparatus 300 may request the user terminal 100 to send second authentication data, in operation S25.

The image processing apparatus 300 may generate second reference data to which a time at which the second authentication data has been requested is reflected, in operation S26.

The user terminal 100 may execute another user interface for acquiring the second authentication data, in operation S27.

The user terminal 100 may request the authentication apparatus 500 to send second authentication data, in operation S28. The user terminal 100 may provide a MAC address of the image processing apparatus 300 and a password of the user terminal 100 to the authentication apparatus 500 to request the authentication apparatus 500 to send the second authentication data.

The authentication apparatus 500 may generate the second authentication data by using variables including information received from the user terminal 100, in operation S29, and provide the second authentication data to the user terminal 100, in operation S30. The second authentication data may be a one-time password (OTP) generated by the authentication apparatus 500.

The user terminal 100 may transmit the second authentication data acquired from the authentication apparatus 500 to the image processing apparatus 300, in operation S31. According to an embodiment, the user terminal 100 may be again requested to send first authentication data together with the second authentication data, and the user terminal 100 may transmit both the first authentication data and the second authentication data input by the user to the image processing apparatus 300.

The image processing apparatus 300 may determine whether the second authentication data received from the user terminal 100 matches the second reference data to perform additional authentication, in operation S32.

The image processing apparatus 300 may provide a result of the additional authentication to the user terminal 100, in operation S33.

When the additional authentication is successful, the user terminal 100 may complete login to access the image processing apparatus 300, in operation S34.

After the user terminal 100 is connected to the image processing apparatus 300, the user terminal 100 may be requested to input the second authentication data periodically from the image processing apparatus 300. The user terminal 100 may acquire the second authentication data from the authentication apparatus 500, and transmit the second authentication data to the image processing apparatus 300. Thereby, the user terminal 100 may be authenticated by the image processing apparatus 300 to keep connecting to the image processing apparatus 300.

The above-described embodiment relates to additional authentication by transmission of a one-time password, however, the embodiment of the present disclosure is not limited to this. By transmitting a password (user device password±OTP) which is a combination of a password of a user (user terminal) set in advance by the user with a one-time password generated randomly, additional authentication may be performed. In this case, security may be more stably ensured. Also, by generating a one-time password using a MAC address, it may be difficult to access a plurality of image processing apparatuses having different MAC addresses by using one password. Also, because the password changes over time, it may be possible to respond effectively against DDOS attacks.

The embodiment of the present disclosure may enhance security with low cost, allow easy maintenance, ensure a user's convenient use, and provide strong security through a combination of dynamic and static passwords.

The authentication apparatus according to an embodiment of the disclosure may be installed in a management apparatus of a security system. Because the management apparatus stores a MAC address of the image processing apparatus connected to a network and an ID and a password of a registered user in advance, the management apparatus may generate a one-time password automatically. Accordingly, the security system may enhance security by a one-time password changing periodically.

The user authentication method according to the embodiment of the disclosure may be implemented as computer-readable codes on a computer-readable recording medium. The computer-readable recording medium may include all kinds of recording devices storing data that can be read by a computer system. Examples of the computer-readable recording medium may be ROM, RAM, CD-ROM, a magnetic tape, a floppy disk, an optical data storage device, etc. Also, the computer-readable recording medium may be distributed to computer systems over a network, in which computer-readable codes may be stored and executed in a distributed manner. In addition, functional programs, codes, and code segments for implementing the present disclosure may be easily deduced by programmers of a technical field to which the present disclosure belongs.

The present disclosure has been descried with reference to the embodiments shown in the drawings. However, the embodiments are only exemplary, and it will be understood by those skilled in that art that various modifications and other equivalent embodiments may be made from the above-described embodiments. Accordingly, the true protecting range of the present disclosure should be determined according to the attached claims.

The invention claimed is:

1. An image processing apparatus comprising at least one processor configured to implement:
   a first authentication unit configured to receive first authentication data from a user terminal, and to determine whether the first authentication data matches pre-stored first reference data to authenticate the user terminal; and
   a second authentication unit configured to generate, when additional authentication is set up, second reference data, to request the user terminal to send second authentication data, to receive the second authentication data from the user terminal, and to determine whether the second authentication data matches the second reference data to authenticate the user terminal,
   wherein the second reference data is generated based on a first value obtained by a combination of a media access control (MAC) address of the image processing apparatus and a password of the user terminal, and a second value obtained by a combination of a time value and a seed value.

2. The image processing apparatus of claim 1, wherein the first reference data includes the password of the user terminal set in the image processing apparatus.

3. The image processing apparatus of claim 1, wherein the seed value is a fixed value assigned to the image processing apparatus.

4. The image processing apparatus of claim 3, wherein the password of the user terminal is a fixed value unless changed by a user of the user terminal, and the second reference data is a one-time code that changes over time.

5. The image processing apparatus of claim 1, wherein the second authentication unit determines a time at which the second authentication unit requests the user terminal to send the second authentication data, according to an additional authentication policy.

6. The image processing apparatus of claim 1, further comprising a synchronizer configured for time synchronization with an apparatus of providing the second authentication data to the user terminal.

7. The image processing apparatus of claim 1, wherein the second authentication unit generates the second reference data in response to a request for setting the additional authentication from the user terminal, and provides the second reference data to the user terminal, and
   wherein the second authentication unit sets the additional authentication in response to a setting for using the second reference data from the user terminal.

8. An authentication apparatus comprising at least one processor configured to implement:
   a synchronizer configured for time synchronization with an image processing apparatus; and
   an authentication data generator configured to receive a request for authentication data (a one-time code that changes over time) from a user terminal, and to generate the authentication data based on a media access control (MAC) address of the image processing apparatus and a password (a fixed value unless changed by a user of the user terminal) of the user terminal set in the image processing apparatus,
   wherein the authentication data is generated based on a first value obtained by a combination of the MAC address of the image processing apparatus and the password of the user terminal, and a second value obtained by a combination of a time value and a seed value (a fixed value assigned to the image processing apparatus).

9. The authentication apparatus of claim 8, wherein the authentication data generator generates the authentication data based on the MAC address and the password included in the request for the authentication data.

10. The authentication apparatus of claim 8, wherein the authentication data generator generates the authentication data based on the MAC address and the password pre-stored in a storage device.

11. The authentication apparatus of claim 8, wherein the seed value is a fixed value assigned to the image processing apparatus, and
   wherein the password of the user terminal is a fixed value unless changed by a user of the user terminal, and the authentication data is a one-time code that changes over time.

12. The authentication apparatus of claim 8, wherein the authentication apparatus is included in the user terminal.

13. A user authentication method of an image processing apparatus, comprising:
   requesting a user terminal to send first authentication data and receiving the first authentication data from the user terminal, by the image processing apparatus;
   determining whether the first authentication data matches pre-stored first reference data;
   determining whether additional authentication is set up, when the first authentication data matches the first reference data;
   requesting the user terminal to send second authentication data, when the additional authentication is set up, and receiving the second authentication data from the user terminal;
   determining whether the second authentication data matches second reference data newly generated; and
   authenticating the user terminal when the second authentication data matches the second reference data,
   wherein the second reference data is generated based on a first value obtained by a combination of a media access control (MAC) address of the image processing apparatus and a password of the user terminal, and a second value obtained by a combination of a time value and a seed value.

14. The user authentication method of claim 13, wherein the first reference data comprises a password of a user terminal set in the image processing apparatus.

15. The user authentication method of claim 13, wherein the seed value is assigned to a user or assigned to the image processing apparatus.

16. The user authentication method of claim 15, wherein the password of the user terminal is a fixed value unless changed by a user of the user terminal, and the second reference data is a one-time code that changes over time.

17. The user authentication method of claim 13, further comprising:
   requesting an authentication apparatus to send the second authentication data in response to a request for the second authentication data from the image processing apparatus, by the user terminal; and
   receiving the second authentication data from the authentication apparatus, and
   providing the second authentication data to the image processing apparatus, by the user terminal.

18. The user authentication method of claim 17, further comprising generating the second authentication data based on the MAC address of the image processing apparatus included in the request for the second authentication data and a password of the user terminal set in the image processing apparatus, by the authentication apparatus.

19. The user authentication method of claim 17, further comprising:
generating the second authentication data based on the MAC address of the image processing apparatus pre-stored in a storage device and the password of the user terminal set in the image processing apparatus, by the authentication apparatus.

20. The user authentication method of claim 13, further comprising:
generating the second reference data in response to a request for setting the additional authentication, received from the user terminal, and providing the second reference data to the user terminal, by the image processing apparatus; and
setting the additional authentication in response to a setting for using the second reference data from the user terminal, by the image processing apparatus.

* * * * *